Figures 1, 2:
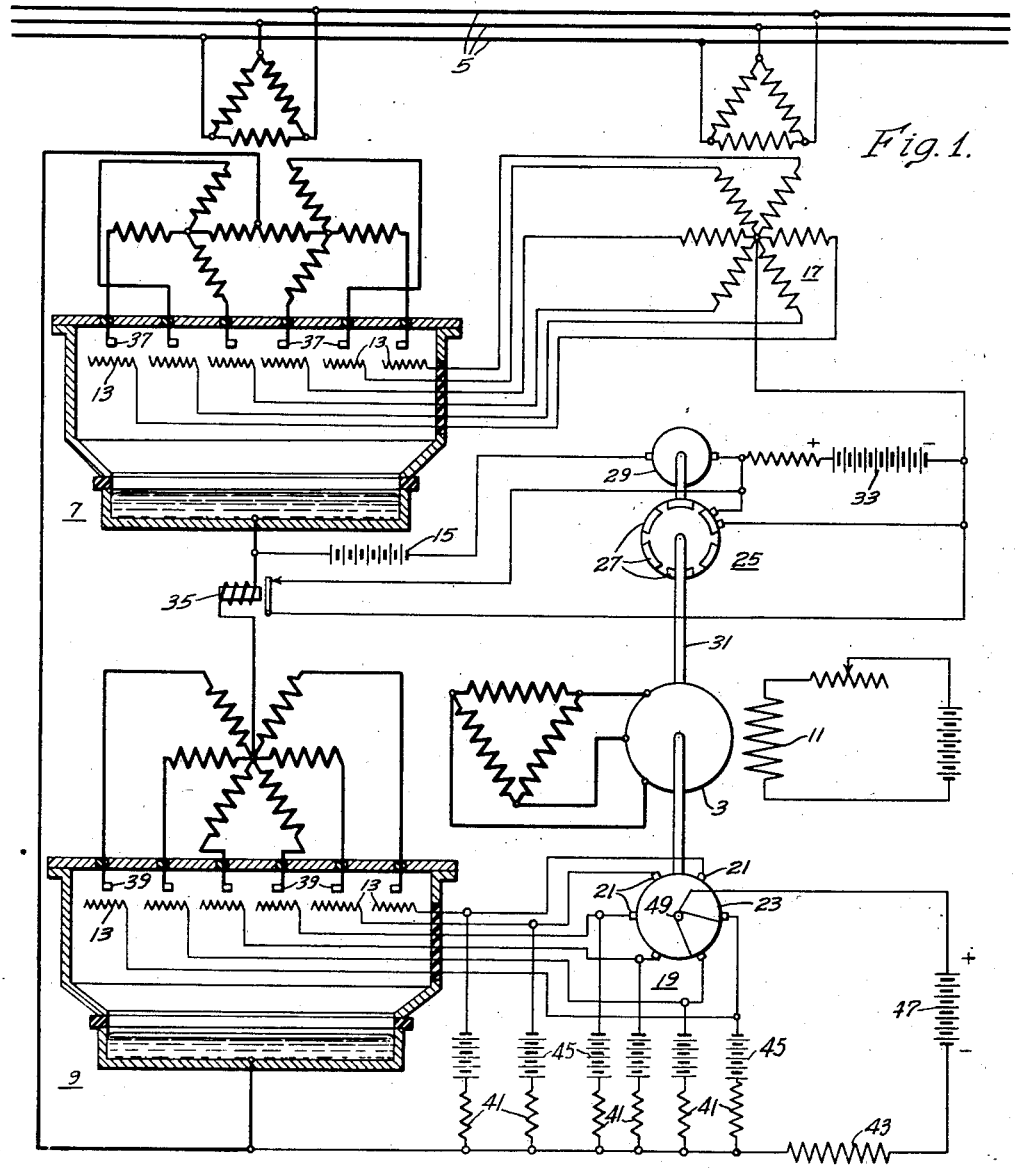

March 12, 1940.     J. SLEPIAN ET AL     2,193,603
FREQUENCY CHANGER
Filed Nov. 24, 1937

WITNESSES:

INVENTORS
Joseph Slepian &
Leon R. Ludwig.
BY
ATTORNEY

Patented Mar. 12, 1940

2,193,603

UNITED STATES PATENT OFFICE 2,193,603

FREQUENCY CHANGER

Joseph Slepian, Pittsburgh, and Leon R. Ludwig, Wilkinsburg, Pa., assignors to Westinghouse Electric & Manufacturing Company, East Pittsburgh, Pa., a corporation of Pennsylvania Application November 24, 1937, Serial No. 176,260

5 Claims. (Cl. 172—274)

Our invention relates to vapor electric converters, and particularly to systems for converting alternating current of one frequency to alternating current of frequencies suitable for operating synchronous motors at variable speed.

In the operation of vapor electric frequency changers, it is customary to provide one converter for converting the supply frequency to direct current and a second converter for converting the direct current to alternating current of the desired frequency.

However, in attempting to operate a synchronous motor at variable speed from an alternating-current line of base frequency through the medium of a rectifier for first converting to direct current and an inverter for then converting the direct current to variable frequency, two difficulties arise. First, unless the output voltage is reduced with the frequency, the magnetizing current becomes excessive. Second, it becomes increasingly difficult to properly commutate the second converter at low frequencies. Normally used commutating means, such as static condensers, are not practical at low frequencies because of the large amount of capacity required. Consequently, when the inverter is to commutate, it is necessary to reduce the current to zero by some special means in order that the current be commutated successfully from one anode to another.

According to the teachings of the prior art, it is well known that when a synchronous motor is operating at normal speed from an inverter as a source of power supply, the synchronous motor will supply sufficient leading wattless power to successfully commutate the inverter. In other words, it is necessary in operating inverters, to stop the flow of current momentarily through the anodes in proper sequence once each cycle in order to energize the various phases properly. However, the power supply to the inverter is direct current, and since it is not possible to stop the flow of anode current in any way within the converter, it then becomes essential to employ a suitable external means to perform this operation.

During normal operation of a synchronous motor, the alternating-current voltage may be utilized to perform this function. At starting, the motor cannot supply the necessary wattless power to commutate the inverter. Therefore, during the starting interval it is essential to provide an external source of power until the motor reaches its normal running speed.

In the construction according to our invention, we propose to grid control the rectifier in order to commutate the inverter. At the time the inverter is to be commutated, the grids of the rectifier are to be completely blocked for a time interval so that the inverter current will be reduced to zero during this interval. With delayed ignition, the inverter current may be brought to zero quickly once every cycle in order to energize the various phases of the motor circuit in proper sequence.

It is, accordingly, an object of our invention to provide means for varying the output voltage with the output frequency in order to maintain the magnetizing current at a constant value.

Another object of our invention is to provide means for commutating the current in the inverter during the interval when the synchronous motor is started until it reaches sufficient speed, whereupon the inverter combination becomes self-commutating.

Still further, it is an object of our invention to provide a system of commutation which will be reliable and automatic in operation irrespective of the output frequency.

Other objects of our invention will be apparent from the following detailed description taken in conjunction with the accompanying drawing, in which:

Figure 1 is a schematic illustration of a vapor electric translating system embodying our invention; and Fig. 2 is a graphical illustration indicating the relationship between the rectifier output voltage and the voltage in the different phases of a synchronous motor.

An alternating-current motor 3 is connected to an alternating-current supply circuit 5 through a vapor electric conversion system comprising a multi-valve converter 7 for converting the alternating-current supply to direct current and a second converter 9 for converting the direct-current output of the first converter 7 into alternating current of the desired frequency for the motor 3. By separately exciting the field 11 of the motor 3 its speed can be controlled.

Preferably, both converters 7 and 9 are provided with suitable grids 13 for controlling the alternating-current output voltage. The first converter 7 has its grids 13 excited by applying a continuous negative voltage from a suitable supply source, such as a battery 15. In addition, the grid transformer 17 will superimpose a constant alternating-current potential from a suitable source of supply 5. The second converter 9 has its grids 13 connected to an impulsing device 19 consisting of an equal number of brushes 21 which periodically come in contact with a conductor 23 permanently mounted on the frame of the impulsing device 19. Conductor 23 is connected to a grid-exciting battery 47 through a stationary ring 49 which is in metallic contact with the revolving conductor 23. Batteries 45, each in series with a resistance 41 which is high as compared to a relatively low resistance 43, are connected between the cathode lead and each of the conductors connecting the grids 13 with the brushes 21 of the impulsing device 19.

The impulsing device 19, as well as a grid blocking commutator 25, provided with a plurality of segments 27 mechanically spaced with relation to the windings of the motor 3 and a small generator 29, are connected directly to the shaft 31 of the motor 3. The function of the commutator 25 is to periodically block the grids 13 of the converter 7 by periodically connecting the battery 33 in series with the negative biasing battery 15. The high negative bias thus supplied by the batteries 15 and 33 completely blocks the grids 13 and interrupts current flow in the converter 7. During normal speed operation of the motor 3, battery 33 and commutator 25 are shunted out of the grid control circuit by a normally closed relay 35 energized by the current in the connection between the cathode of converter 7 and the anodes of converter 9.

In the operation of the system according to our invention, it will be assumed that the operation begins when the grid blocking commutator 25 is in such a position that the battery 33 is short circuited. The first converter 7 will then conduct a current through one of its anodes 37, which will then flow through a corresponding anode 39 of the second converter 9, as determined by the position of the brushes 21 of the impulsing device 19. This pulse of current will flow through a phase winding of the motor 3 and cause it to rotate. In turn, the rotation of the motor 3 opens the circuit of the grid blocking commutator 25, thus introducing a relatively high negative voltage from the blocking battery 33 which will completely block all grids 13 and anodes 37 of the first converter 7. At this instant, current will flow through one of the anodes 39 of the second converter 9. Normally the grids 13 of the second converter 9 are biased by a battery 45, thereby maintaining the grids 13 in a blocking state. However, during the instance current is flowing through one of the anodes 39 of the second converter 9, the corresponding grid 13 is released, for periodically the potential from battery 45 is counterbalanced by a voltage obtained from battery 47 upon rotation of the impulsing device 19.

The impulsing device 19 being rotatably mounted with the motor 3, moves to a new position and the grid 13 of the second converter 9 next in firing order will become positive. Further rotation of the motor 3 will permit the grid blocking commutator 25 to disconnect the blocking battery 33 from the grid circuit, releasing the grids 13 of the first converter 7 which will permit another pulse of current to flow through another anode 39 of the second converter 9 and energize another phase winding of the motor 3. This process is continued until the motor 3 reaches sufficient speed, in which case the converter combination becomes self-commutating.

The relay 35 which normally does not permit the grid blocking commutator 25 to function will open by the passage of comparatively high impulses of starting current. Nevertheless, as the motor 3 gains speed and the current diminishes the relay 35 will gradually close and short circuit the grid blocking commutator 25 when its use is no longer necessary.

During normal operating speed of the motor 3, the direct-current generator 29 which is directly connected to the motor shaft 31, will deliver a positive potential to the grids 13 of the first converter, which is in direct opposition to the negative potential of the battery 15. The resulting effect is that the two potentials counteract each other and the anodes 37 of the first converter 7 will fire without delay. It is to be assumed that the relay 35 is closed with the result that the grid blocking commutator 25 and the battery 33 are not in the grid circuit.

Assuming that the speed of the motor 3 decreases, the voltage of the generator 29 will decrease and a negative bias potential from the battery 15 will be applied to the grids 13 of the first converter 7. The anodes 37 of this converter 7 will be delayed in firing with a consequent decrease in the voltage output of the first converter 7 and also the second converter 9.

While we have shown and described certain specific embodiments of our invention, it will be apparent that changes and modification can be made therein without departing from the true spirit of the invention and the scope of the accompanying claims.

We claim as our invention:

1. In an electric translating system comprising, in combination, a plurality of electric converters and a motor driven at a variable speed by variable frequency power supplied by said converters, one of said converters for converting alternating supply current to direct current, another of said converters for converting direct current into alternating current at a frequency independent of the frequency of the supply current, each of said converters provided with a cathode, a plurality of anodes and cooperating electrodes associated with each of said anodes, a source of bias potential for said cooperating electrodes in one of said converters, means for controlling the operation of said cooperating electrodes, said control means including a rotating contactor provided with a plurality of insulated segments, blocking potential for said cooperating electrodes in one of said converters, a relay means for normally rendering said rotating contactor and said blocking potential inoperative, a generator for said control means, an impulsing contactor rotatably mounted, a plurality of brushes for periodically contacting said impulsing contactor and connected to respective cooperating electrodes of the second of said converters, said cooperating parts of said control means driven by said motor whereby the output voltage of said second converter varies directly with the output frequency.

2. A frequency changer system for supplying a variable speed synchronous type motor from a constant frequency source comprising a plurality of serially connected valve type converters, control means associated with the valves of each of said converters, a control transformer connected to the control electrodes of the converter connected to the constant frequency source, a return connection from said control transformer to the cathode connection of said converter, a source of constant bias connected in series with said connection, a source of bias potential in said connection variable with the speed of said motor, a source of blocking potential in said connection, means responsive to motor speed for sequentially controlling the operating condition of said blocking potential source, a current responsive relay for controlling the operating condition of said source of blocking potential irrespective of said speed responsive means, a source of control potential for the converter connected to said motor, and contact means responsive to the speed of said motor for applying control potential to the control electrode associated with said last-mentioned converter.

3. A frequency changing system for supplying variable frequency alternating current from a source of constant frequency alternating current comprising a valve type converter connected to said constant frequency source for converting the source of frequency potential to direct current potential, an inverted valve type converter for converting the direct-current output of said first-mentioned converter to alternating current of the desired frequency, a source of control potential for said inverted converter, control electrodes associated with the valves of said inverted converter, means responsive to the output frequency of said inverted converter for sequentially applying said control potential to the control electrodes of said inverted converter, control electrodes associated with the valves of said first-mentioned converter, a control transformer for applying control potential to the control electrodes of said converter, a source of blocking potential connected to said control transformer, and contact means responsive to the frequency of the inverted converter for sequentially varying the operating condition of said source of blocking potential, and current responsive means for controlling the operative condition of said source of blocking potential independent of said first-mentioned control means.

4. A frequency changing system comprising a valve type converter connected to a source of alternating current, a second converter serially connected to the output side of said first converter, a motor driven at variable speed by variable frequency supplied by said second converter, control means operated by said motor for periodically controlling the flow of operating current through both said converters, a plurality of segmented contactors rotatable with said motor, a source of blocking potential for the first converter, one of said contactors controlling the application of blocking potential to the control electrodes of the first converter, another of said contactors electrically connected to the control electrodes of said second converter and means responsive to the flow of current in said first converter for controlling the operation of said first-mentioned contactor independently of the output current of said second converter.

5. An electric power translating system comprising a source of electric current, a variable speed electric motor, means including two serially connected electric converters interconnecting said source and said motor to transmit energy therebetween, each of said converters consisting of a plurality of main electrodes providing a plurality of arc paths therebetween, and auxiliary electrodes for controlling the transfer of an arc from one of said main electrodes to another of said main electrodes, a source of biasing potential for the auxiliary electrodes of the first said converter, means for connecting said source of biasing potential to said auxiliary electrodes to retard the firing time of the main electrodes of said first converter, an auxiliary source of biasing potential, said auxiliary source developing a potential dependent on the speed of said motor and having a maximum potential of the order of magnitude of that of said first mentioned source of biasing potential, said auxiliary source of biasing potential being connected in series opposition to said first source of biasing potential whereby the firing time of said first converter is controlled in accordance with the speed of said motor.

JOSEPH SLEPIAN.
LEON R. LUDWIG.